July 25, 1944.    H. J. LIDKEA    2,354,389
FRICTION ELEMENT
Filed March 17, 1941
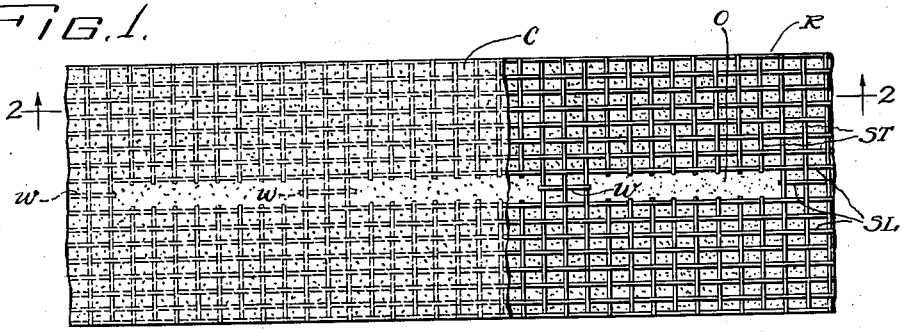
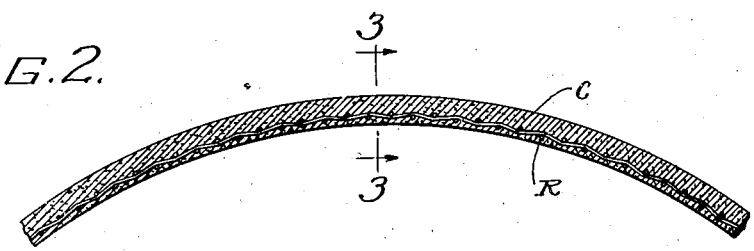
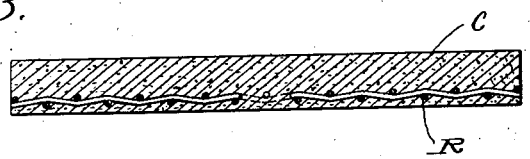
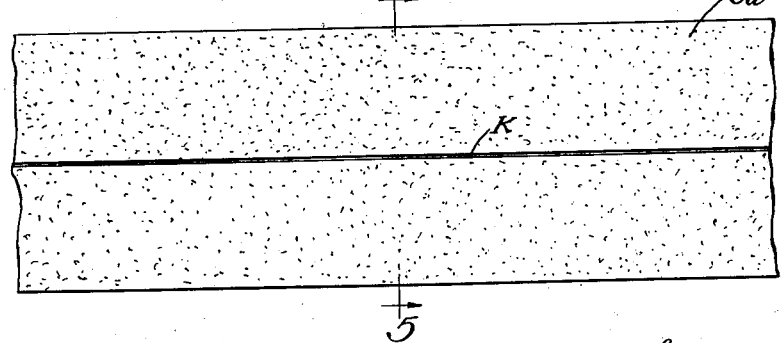
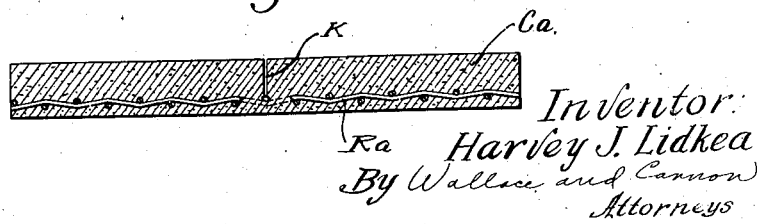
Inventor:
Harvey J. Lidkea
By Wallace and Cannon
Attorneys Patented July 25, 1944

2,354,389

UNITED STATES PATENT OFFICE 2,354,389

FRICTION ELEMENT

Harvey J. Lidkea, Detroit, Mich., assignor to American Brake Shoe Company, a corporation of Delaware Application March 17, 1941, Serial No. 383,737

6 Claims. (Cl. 192—107)

This invention relates to friction elements and more particularly to composition friction elements of which those employed in the brakes and clutches of automotive vehicles and the like are exemplary.

Composition friction elements are customarily compounded from a mixture of asbestos or other fibrous material, friction-controlling and imparting ingredients and a bond. In the main the bond has been either of such nature that it was converted into cured state in the finished friction elements by being subjected to heat and pressure or by being subjected only to heat in a suitable oven or the like. Those friction elements embodying a bond cured by heat and pressure are usually more or less rigid and of such configuration as to fit a particular support and such elements usually possess sufficient innate strength as not to require reinforcement. However, those friction elements embodying a bond that is cured by being subjected only to heat in an oven or the like are usually sufficiently flexible to enable them to be fitted onto various sized or shaped supports, and it has been customary, to insure that such a friction element will possess sufficient strength to withstand the stresses to which it is subjected when being fitted to a support and while in use on the support, to incorporate a reinforcement in the element, a wire mesh backing usually being employed for this purpose. In its more specific aspects my invention relates to friction elements embodying a wire mesh or like reinforcement and a bond that is cured by being subjected only to heat.

One convenient way of producing friction elements of the character to which this invention primarily pertains is to intermix the desired constituents and to introduce these intermixed constituents or ingredients into the hopper of a rolling machine of the character disclosed, for example, in Smith Patent No. 1,920,023, patented July 25, 1933. In a machine of this character the ingredients are fed from the hopper to the bite between a pair of forming rollers. A continuous strip of wire mesh backing or the like is fed through the bite between these rollers and as the strip advances to the bite between the rollers, the intermixed ingredients are introduced thereunto so that as the backing and the intermixed ingredients pass through the bite between the rollers the ingredients are compressed and packed into the interstices or other openings in the strip which therefore affords a backing. As the backing with the intermixed ingredients packed thereonto passes from the bite between the rollers, the resulting strip of material is either rolled into suitable coils of predetermined length or it is divided into relatively short strips. Thereafter such coils or strips are converted into friction elements by usually being placed on suitable trays or the like and then being passed through a continuous oven to be subjected to temperatures and for a period of time suitable for effecting cure of the bond for the other constituents or ingredients.

Inasmuch as the backing customarily employed in friction elements made in the aforesaid or an equivalent manner is usually metallic while the intermixed ingredients affording the body of the elements are mainly asbestos and other organic or inorganic materials, such composition body and the metallic backing usually have different coefficients of expansion. Furthermore, as stated, the cure of the bond of such elements is usually effected by heat in the absence of pressure wherefore the elements are not held to a determined configuration during cure of the bond. Hence if the composition body and the metallic reinforcement expanded unevenly during the cure of the bond by heat, the element may warp as by bowing transversely of the longitudinal extent of the strip-like form thereof. When friction elements are so warped, it is necessary to subject them to pressing and grinding operations so as to provide a flat wearing face thereon transversely thereof and sometimes it has been necessary to grind away an appreciable portion of the composition body to afford such a flat wearing face. This is objectionable, among other reasons, because it reduces the thickness and consequently the life of the elements.

Furthermore, in the uses to which composition friction elements are put they are often subjected to heat for comparatively short operative periods intermediate of which the elements may cool and by reason of such heating and cooling, which may vary over rather widely separated temperature differences, and even though the elements are firmly secured to suitable supports, it has been observed that the elements display a tendency to curl away from the supports thereof, especially at the edges thereof. This disrupts the desired flat operative faces on the elements and subjects such curled portions to greater wear than the other portions thereof, thus reducing the useful life of the elements. Such curling of the elements is otherwise objectionable for it may, by way of example, impair the adjustment between the parts with which the elements are associated and give rise to objectionable vibration in such parts so as to cause them to be noisy.

Thus the primary object of my invention is to enable the production and use of composition friction elements embodying a metallic reinforcement, such as a wire mesh backing, in such a way as to reduce objectionable warping or curling thereof to a minimum.

It has been observed that the degree of warping or bowing of friction elements that occurs during the cure of the bond thereof, as aforesaid, and the objectionable curling of the elements during use thereof, are almost directly proportionate to the width of the element transversely to the longitudinal extent of the substantially strip-like form thereof, which is to say, the greater the width the more pronounced the warping or curling. Hence, still another object of this invention is to so arrange composition friction elements or the like that, in the event any warping or bowing thereof is occasioned during the cure of the bond included therein or in the event there is a tendency for the elements to curl during use thereof, a plurality of relatively restricted bowed or arc-shaped portions will arise in contradistinction to a relatively protracted single bowed or arc-shaped formation and thereby, since each of the plurality of bowed or arc-shaped formations will be of relatively restricted size, reduce in the aggregate the degree of warping or bowing, as a result facilitate affording a flat operative wearing face on the elements and also thereby assure that the elements will not detrimentally curl away from the supports therefor during use thereof.

Since warping and curling of a composition friction element arises primarily from a difference in the coefficients of expansion of the composition body and the metallic reinforcement thereof, still another object of this invention is to enable limited unequal expansion of the body and backing by rendering one or the other substantially discontinuous transversely of the element and more specifically it is an object of this invention to divide either the composition body or the metallic reinforcement into at least substantially independent sections longitudinally of the element.

It is essential, in order to insure safe operation of a friction element in use that the reinforcement be prevented from separating transversely of the element and hence while in some embodiments of my invention the reinforcement may be divided into substantially independent sections transversely of the element, it is nevertheless a further object of my invention to so arrange the backing and the element that separation thereof transversely therealong will be prevented. It is to be observed that if the backing of a composition friction element be divided into independent sections and such an element is secured to a support therefor by having rivets or the like passed through such independent sections then, in the course of the use of the element, there may be such an unequal distribution of the stress which arises during use of the element that the composition body might be ruptured or otherwise damaged. Moreover, it has been observed, when composition friction elements are made by having the backing therefor passed between a pair of rollers effective to pack the composition body onto the backing, that the backing is subjected to a twisting action which can only be effectively resisted if the stresses of such action are dissipated across the entire width of the element. By way of example, if two independent strips were passed between a pair of packing rollers to have a composition body packed thereonto, there would be a tendency for the strips to advance at unequal speeds and this would result in twisting of the element longitudinally of the strip-like form thereof. Thus, it is a further object of this invention to insure that stresses effective on the backing of a composition friction element during the manufacture or use thereof will be distributed uniformly throughout the backing.

A yet further object is to divide the backing for a composition friction element into such substantially independent sections that objectionable warping or curling of the element may be avoided but at the same time to prevent objectionable relative movement of such sections toward and away from each other, and an ancillary object is to interconnect substantially independent sections of a composition friction element backing by bridging portions arranged at intervals along the extent of such sections.

A still further object to utilize a substantially continuous backing in a composition friction element and to so divide the composition body thereof into such substantially independent sections that objectionable warping or curling of the element may be avoided.

Other and further objects of the present invention will be apparent from the following description and claims and are illustrated in the accompanying drawing which, by way of illustration, shows preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawing,

Fig. 1 is a fragmentary elevational view of the wearing face of a composition friction element embodying one form of my invention and in which a part of the composition body is broken away to disclose the wire mesh reinforcement included in this friction element;

Fig. 2 is a longitudinal sectional view taken substantially on the line 2—2 on Fig. 1;

Fig. 3 is a transverse sectional view taken substantially on the line 3—3 on Fig. 2;

Fig. 4 is a fragmentary elevational view of a wearing face of a friction element embodying another form of my invention; and Fig. 5 is a transverse sectional view taken subtially on the line 5—5 on Fig. 4.

Referring to the accompanying drawing, the friction element illustrated in Figs. 1, 2 and 3 includes a composition body C having a wire mesh reinforcement R embedded in the back thereof. Since my invention is primarily useful in those instances where the bond of the composition body C is to be cured to final state by heat in the absence of pressure, the composition body may advantageously include as the bond thereof a vegetable drying oil such as purely polymerized but not otherwise changed linseed oil, although it will be understood that a wide variety of other vegetable drying oils and the like may be employed as the bond. Furthermore, the bond may be afforded by an oil modified phenol aldehyde resin or by an intermixture of a suitable vegetable drying oil and a phenol aldehyde resin or the like, the use of a resin of the aforesaid character as the bond or the inclusion of such resin as a part of the bond usually affording a friction element embodying greater innate strength than that possessed by a friction element having only a vegetable drying oil as the bond thereof. In any event, however, the bond employed is desirably of such a nature that it may be converted to a final cured state by being subjected to heat in the absence of pressure.

It will be understood that the composition body may be compounded from a wide variety of ingredients such as asbestos or other fibrous material, friction-controlling and imparting ingredients and a bond. A typical formula which may be followed in compounding a composition body of the aforesaid character is the following, wherein all parts are indicated by weight:

| | Parts |
|---|---|
| Asbestos | 65 |
| Pulverized pyrobituminous material | 20 |
| Purely polymerized and not otherwise chemically changed linseed oil | 15 |
| Sulphur | 3 |
| Solvent | 7 |

In compounding friction elements according to the foregoing formula the oil which affords the bond is dissolved in the solvent, which may be a petroleum thinner such as petroleum naphtha having an end point not substantially greater than 400° F., and thereafter the asbestos, the pulverized pyrobituminous material, which may be bituminous coal, and the sulphur are introduced into the dissolved bond and are thoroughly intermixed until a uniform dispersion of the bond throughout the other ingredients is attained. Thereafter the mixture is formed into suitable shapes as by being introduced into the hopper of a rolling machine of the character disclosed, for example, in the aforesaid Smith Patent No. 1,920,023, and as the mixture is fed to the bite between the forming rollers in a machine of this character it is packed onto the wire mesh backing as R as this is fed through the bite between the rollers, the backing in such an instance being afforded in the form of a continuous strip. After passage from the bite between the rollers, the continuous strip afforded by the composition body packed onto the wire mesh or equivalent backing may be rolled into suitable coils of, for example, about twenty-five feet in length and from ten to twenty-four inches in diameter or the continuous strip may be divided into relatively short strips of, for example, from six to fifteen inches in length. Such coils or short strips are thereafter desirably passed through a continuous oven for a period of about eighteen hours to be subjected to gradually increasing temperatures from about 180° F. to 325° F. to convert the bond to a solid state, the inclusion of sulphur, as specified in the foregoing formula, being for the purpose of sulphurizing the oil to assist conversion thereof into a solid state.

It will be understood that friction elements embodying the present invention may be compounded in a wide variety of ways other than that hereinabove described to include a composition body as C and a reinforcement as R for my invention is primarily effective during the cure of the bond of the friction elements into a final solid state and during the use of the elements.

It has been explained hereinabove that a composition body as C and a reinforcement as R usually have different coefficients of expansion and as a result when coils or short strips, as aforesaid, or the like are subjected to heat in the absence of pressure, for example, in the manner hereinabove explained, the composition body as C and the reinforcement as R may expand unequally by reason of the difference in the coefficients of expansion thereof. As explained hereinabove, this has heretofore resulted in warping of coils or short strips, as aforesaid, or the like and usually such warping has been in the form of bowing of the coiled or strip material or the like transversely of the longitudinal extent of such a relatively elongated friction element.

Furthermore, as explained hereinabove, in the uses to which composition friction elements are put they are often subjected to heat for comparatively short operative periods intermediate of which the elements may cool and by reason of such heating and cooling, which may vary over rather widely separately temperature differences, and even though the elements are firmly secured to suitable supports, it has been observed that the elements display a tendency to objectionably curl away from the supports to which they are secured in the use thereof and thereby impair the operation of the parts with which they are used or else this may cause the elements to wear unevenly and thereby shorten the useful life thereof.

I have found, however, that objectionable warping and curling, of which that above explained is typical, may be reduced to a substantially unobjectionable minimum if the reinforcement R is divided into substantially independent sections as by having portions of the transversely extending strands ST thereof, and desirably also portions of the longitudinally extending strands SL thereof, interrupted in the medial part of the reinforcement to thereby afford openings as O in the medial part of the reinforcement. I prefer, however, to provide openings as O in the reinforcement R at intervals rather than to divide the reinforcement R into wholly independent sections. Hence, at intervals along the medial part of the longitudinal extent of the reinforcement R the strands ST and SL are not cut away whereby what, in effect, are webs W are provided intermediate openings as O so that what, in effect, are substantially independent sections, into which the reinforcement R is divided by the provision of openings as O, are interconnected at intervals by the webs as W.

The provision of interconnections as the webs W at intervals along the longitudinal extent of the reinforcement as R prevents separation of the substantially independent sections into which the reinforcement is divided by the provision of openings as O therein, and this enables a backing as R to afford a degree of reinforcement substantially equal to that afforded by a backing not having openings as O included therein. I have observed that if a reinforcement as R is divided into wholly independent longitudinally extending sections, there is a tendency for the composition body of the friction elements to separate, as by cracking, in alignment with the separation between the independent sections of the reinforcement which obviously might give rise to a dangerous condition during use of the friction elements as where the elements are secured to the brake shoes of the brake couple of an automotive vehicle or the like. However, I have found that webs as W or equivalent interconnection effectively prevent such tendency of the composition body to crack or otherwise separate inasmuch as stresses to which the backing and element may be subjected are uniformly distributed and thereby safe operation of the friction elements is assured.

Desirably the webs as W are kept as small as possible so as to permit independent expansion of the sections into which the reinforcement as R is divided by the provision therein of openings as O, for this, I have observed, reduces warping and curling of composition friction elements during the cure of the bond and use thereof to a substantially unobjectionable minimum.

Another embodiment of my invention is illustrated in Figs. 4 and 5 and in this form of my invention the reinforcement Ra is continuous both longitudinally and transversely of the friction element which includes a composition body Ca that desirably is of the character hereinabove described. In this instance, however, the composition body Ca has a longitudinally extending kerf or slot K formed therein midway between the side edges thereof which extends into the composition body C from the operative or wearing face thereof to the reinforcement as Ra included therein. I have observed that such division of the composition body into such substantially independent longitudinally extending sections also insures that any tendency of the composition friction elements to warp during the cure of the bond included therein, and curling of the elements during use thereof, to a substantially unobjectionable minimum, for in this instance the sections of the composition body may expand independently when the elements are subjected to heat, and it is this that enables the aforesaid desirable results to be realized. Furthermore, a friction element of this character is effectively reinforced for the reinforcement as Ra included therein is continuous.

While I have illustrated and described selected embodiments of my invention, it is to be understood that these are capable of variation and modification and I therefore do not wish to be limited to the precise details set forth but desire to avail myself of such changes and alterations as fall within the purview of the following claims.

I claim:

1. A relatively elongated friction element comprising a composition body and a reinforcing back having unlike coefficients of expansion, said back being divided into substantially independent sections longitudinally thereof to thereby minimize the effects of unequal heat induced expansion and contraction of said body and back, said sections being interconnected at spaced intervals therealong only by relatively narrow webs.

2. A relatively elongated friction element comprising a composition body and a reinforcing back having unlike coefficients of expansion, said back having longitudinally extending slots formed therein at spaced intervals therealong to thereby divide the back into substantially independent sections which extend longitudinally thereof but which are interconnected only by relatively narrow webs intermediate said spaced slots to thereby minimize the effects of unequal heat induced expansion and contraction of said body and back.

3. A relatively elongated friction element comprising a composition body and a reinforcing back having unlike coefficients of expansion, said back comprising substantially independent sections longitudinally thereof and including relatively small webs which are the interconnection between said sections, said webs being disposed at spaced intervals along the sections whereby the sections are held against movement relative to each other and the body and yet are effective to minimize the effects of unequal heat induced expansion and contraction of said body and back.

4. A relatively elongated friction element comprising a composition body and a metallic reinforcing back, said body and back having unlike coefficients of expansion, said back having longitudinally extending but discontinuous slots formed therein at spaced intervals longitudinally therealong to thereby divide the back into substantially independent sections longitudinally thereof to thereby minimize the effects of unequal heat induced expansion and contraction of said body and back, there being only relatively narrow webs in said back between said slots which interconnect said sections to each other.

5. A relatively elongated friction element comprising a composition body and a metallic reinforcing back, said body and back having unlike coefficients of expansion, said back comprising substantially independent sections longitudinally thereof and including only relatively small webs to interconnect such sections at spaced intervals whereby the sections are held against movement relative to each other and the body and yet are effective to minimize the effects of unequal heat induced expansion and contraction of said body and back.

6. A relatively elongated friction element comprising a composition body and a wire mesh reinforcing back embedded in said body, said body and back having unlike coefficients of expansion, and said back having longitudinally extending slots therein extended between relatively narrow webs that interconnect said sections at intervals whereby the back is divided into substantially independent sections that are held against movement relative to each other and the body by said webs but which are effective to minimize the effects of unequal heat induced expansion and contraction of said body and back.

HARVEY J. LIDKEA.